US010539590B2

(12) United States Patent
Wu et al.

(10) Patent No.: US 10,539,590 B2
(45) Date of Patent: Jan. 21, 2020

(54) HIGH MAGNETIC FIELD SCANNING PROBE MICROSCOPE EMPLOYING LIQUID HELIUM-FREE ROOM-TEMPERATURE BORE SUPERCONDUCTING MAGNET

(71) Applicant: FUDAN UNIVERSITY, Shanghai (CN)

(72) Inventors: Shiwei Wu, Shanghai (CN); Zeyuan Sun, Shanghai (CN); Shuai Zhang, Shanghai (CN); Di Huang, Shanghai (CN); Shengyu Zhou, Shanghai (CN); Lifeng Yin, Shanghai (CN); Chunlei Gao, Shanghai (CN); Jian Shen, Shanghai (CN)

(73) Assignee: FUDAN UNIVERSITY (CN)

( * ) Notice: Subject to any disclaimer, the term of this patent is extended or adjusted under 35 U.S.C. 154(b) by 0 days.

(21) Appl. No.: 16/070,909

(22) PCT Filed: Dec. 16, 2016

(86) PCT No.: PCT/CN2016/110236
§ 371 (c)(1),
(2) Date: Jul. 18, 2018

(87) PCT Pub. No.: WO2017/124864
PCT Pub. Date: Jul. 27, 2017

(65) Prior Publication Data
US 2019/0025339 A1    Jan. 24, 2019

(30) Foreign Application Priority Data
Jan. 22, 2016 (CN) .......................... 2016 1 0042953

(51) Int. Cl.
*G01Q 30/18* (2010.01)
*G01Q 60/16* (2010.01)
(Continued)

(52) U.S. Cl.
CPC ............. *G01Q 30/18* (2013.01); *F17C 3/085* (2013.01); *G01Q 30/16* (2013.01); *G01Q 60/16* (2013.01);
(Continued)

(58) Field of Classification Search
CPC ........ G01Q 30/18; G01Q 30/16; G01Q 60/16; F17C 3/085; F17C 2203/0687; F17C 221/017; F17C 2223/0161; H01F 6/04
(Continued)

(56) References Cited

U.S. PATENT DOCUMENTS

| 5,654,546 A | 8/1997 | Lindsay | |
| 9,552,906 B1 * | 1/2017 | Mine | G01R 15/202 |

(Continued)

FOREIGN PATENT DOCUMENTS

| CN | 101294889 | 10/2008 |
| CN | 103174930 | 6/2013 |

(Continued)

OTHER PUBLICATIONS

Li, Quanfeng, "Developments of Ultra-fast and High Magnetic Field Scanning Tunneling Microscopes", China Doctoral Dissertations Full-text Database, 2013, ISSN: 1674-022x, C030-4, pp. 58-60. Abstract Only; Abstract retrieved from http://oversea.cnki.net/kcms/detail/detail.aspx?dbcode=CDFD&QueryID=4&CurRec=3&dbname=CDFD1214&filename=1012503563.nh on Jun. 29, 2018.

(Continued)

*Primary Examiner* — Nicole M Ippolito
(74) *Attorney, Agent, or Firm* — Kilpatrick Townsend & Stockton LLP

(57) ABSTRACT

A scanning probe microscope of the present disclosure includes: a room-temperature bore superconducting magnet including a liquid helium-consumption free closed-cycle cooling system, a superconducting magnet, and a chamber having a room-temperature bore; and a scanning probe microscope including a scanning head, a vacuum chamber, and a vibration isolation platform; and a computer control system. The room-temperature bore superconducting magnet is cooled by the cryogen-free closed-cycle cooling
(Continued)

system which eliminates the dependence on liquid helium for high magnetic field operation. There is no physical contact between the scanning probe microscope and the superconducting magnet connected to the closed-cycle cooling system. The scanning probe microscope can achieve atomic-scale spatial resolution. The temperature of the scanning probe microscope is not restricted by the low temperature conditions for operation of the superconducting magnet. The scanning probe microscope and the vacuum chamber can achieve high-temperature baking independent of the superconducting magnet for ultra-high vacuum conditions.

20 Claims, 3 Drawing Sheets

(51) Int. Cl.
  *G01Q 30/16*  (2010.01)
  *F17C 3/08*  (2006.01)
  *H01F 6/04*  (2006.01)

(52) U.S. Cl.
  CPC ........ *H01F 6/04* (2013.01); *F17C 2203/0687* (2013.01); *F17C 2221/017* (2013.01); *F17C 2223/0161* (2013.01)

(58) Field of Classification Search
  USPC ............................................................. 850/17
  See application file for complete search history.

(56) References Cited

U.S. PATENT DOCUMENTS

| | | | | |
|---|---|---|---|---|
| 2005/0057248 | A1* | 3/2005 | Woods | G01Q 60/54 324/248 |
| 2007/0046287 | A1* | 3/2007 | Vervaeke | G01R 33/0094 324/251 |
| 2007/0272855 | A1* | 11/2007 | Tanda | B82Y 15/00 250/306 |
| 2011/0309330 | A1* | 12/2011 | Ohnesorge | B82Y 10/00 257/20 |

FOREIGN PATENT DOCUMENTS

| | | |
|---|---|---|
| CN | 103901232 | 7/2014 |
| CN | 104714053 | 6/2015 |
| CN | 105572423 | 5/2016 |

OTHER PUBLICATIONS

PCT International Search Report for PCT/CN2016/110236 dated Mar. 10, 2017. (6 pages).

* cited by examiner

HIGH MAGNETIC FIELD SCANNING PROBE MICROSCOPE EMPLOYING LIQUID HELIUM-FREE ROOM-TEMPERATURE BORE SUPERCONDUCTING MAGNET

CROSS-REFERENCE TO RELATED APPLICATIONS

This application is the national stage application under 35 U.S.C. 371 of PCT application number PCT/CN2016/110236 filed Dec. 16, 2016, which claims priority to Chinese application number CN 201610042953.3 filed Jan. 22, 2016, the disclosures of which are incorporated in their entirety by reference herein.

FIELD OF THE DISCLOSURE

The present disclosure is related to the technical field of scanning probe microscopes. Specifically, it is a high magnetic field scanning probe microscope based on a liquid helium consumption-free room-temperature bore superconducting magnet.

BACKGROUND

The scanning probe microscope (SPM) is a general term that includes scanning tunneling microscopes and atomic force microscopes. The underlying principles of SPMs are to make use of tunneling currents, chemical forces, and electrostatic forces between the microscope probes and the test sample. When the probe scans a surface of a sample, the change in the interaction between the probe and the sample can reflect a great deal of information on the sample, such as surface morphology, electronic density distribution, and surface potential.

Over the last 30-plus years of development, types of scanning probe microscopes have continually expanded and improved and have become indispensable research tools in fields such as surface science, materials science, physics, chemistry, and biology. Over the course of their development, various types of scanning probe microscopes have generally specified placement of the SPMs in different kind of environments such as ultra-high vacuum, low temperature, magnetic fields, electric fields, microwave, and optical fields. Through adjusting and regulating environmental parameters, the performance of scanning probe microscopes can be improved and achieve more precise measurements.

As for a scanning probe microscope under a high magnetic field, many physical processes and phenomena can occur to a test sample under the action of an external magnetic field such as electron spins or even nuclear spins that start to precess or flip. Under the current technologies, the magnetic field is achieved by using a superconducting coil magnet made of superconducting material with zero resistance effect. However, the superconducting magnet needs to be maintained under a low-temperature environment, since the superconducting phase transition temperatures are relatively low (usually less than 10 K). In the field of scanning probe microscope, because the probe and the sample are very close to each other, may be as low as a scale of a single atom size, the SPMs are extremely sensitive to external vibrations and noise from the environment.

Thus, for scanning probe microscopes under a high magnetic field environment, superconducting magnets are usually placed in a liquid helium Dewar cryostat. The cooling is achieved through the latent heat during phase change of liquid helium at 4.2 K, in order to achieve the superconducting phase transition temperature of superconducting magnet, and then large electrical current is introduced to generate high magnetic field. Because the liquid helium itself does not generate vibrations, it can be directly integrated with the scanning probe microscope to form a low-temperature, high magnetic field environment. However, liquid helium is a globally scarce resource that is very expensive. Because liquid helium is a non-renewable resource, in recent years, the price of liquid helium has been rising steadily. In light of this, cryogen-free closed-cycle cooling systems that do not consume liquid helium, such as Gifford-McMahon and pulse tube cryogen-free cooling systems, are being commonly used worldwide for the cooling of superconducting magnets. However, because of the relatively strong mechanical vibrations and noise of existing cryogen-free closed-cycle cooling systems, the scanning probe microscopes, which are extremely sensitive to vibrations and noise, cannot utilize those superconducting magnets cooled by existing cryogen-free closed-cycle cooling systems. So, it is desirable to develop scanning probe microscopes in high magnetic environments that can utilize cryogen-free closed-cycle cooling systems.

SUMMARY

The purpose of the present disclosure is to describe a high magnetic field scanning probe microscope based on a liquid helium-free room-temperature bore superconducting magnet, and the scanning probe microscope also achieves an atomic resolution due to low vibration.

According to some embodiments of the present disclosure, the high magnetic field scanning probe microscope based on a liquid helium-free room-temperature bore superconducting magnet includes: a liquid helium-consumption free room-temperature bore superconducting magnet, a scanning probe microscope, and a computer-controlled circuit system. The liquid helium-consumption free room-temperature bore superconducting magnet includes: a liquid helium-free closed-cycle cooling system, a superconducting magnet and a chamber having a room-temperature bore. The scanning probe microscope includes: a scanning head, a microscope vacuum chamber, and a vibration isolation platform for placing the microscope.

For the liquid helium-consumption free room-temperature bore superconducting magnet, the liquid helium-free closed-cycle cooling system is used to cool the superconducting magnet, to achieve a low temperature environment for operating the superconducting magnet. The cooling method can be realized by connecting the cold end of a cryogen-free cooling system to the superconducting magnet through metals having high thermal conductivities such as oxygen-free copper, forming a thermal contact for heat exchange and cooling. The cooling method can also be realized by liquefying and maintaining helium in a superconductor chamber by the cryogen-free cooling system, so that the superconducting magnet is bathed in the liquid helium, achieving operating temperature of the superconducting magnet. The superconducting magnet itself includes a solenoid or a discrete coil made by superconducting materials. The superconducting magnet can be a one-dimensional high magnetic field or a two-dimensional or three-dimensional vector high magnetic field magnet. The strongest point of the magnetic field produced by the superconducting magnet is at the center of the superconducting magnet, which is also the center of the room-temperature bore chamber. The room-temperature bore of the room-temperature chamber needs adequate space to accommodate scanning head of the scanning probe microscope and a portion of microscope vacuum chamber. There is no direct physical contact between the superconducting magnet and microscope vacuum chamber, in order to prevent the vibrations of the cryogen-free cooling system from being directly transmitted to the scanning probe microscope. The entire liquid helium-consumption free room-temperature bore superconducting magnet is fixed to a floor, ceiling, or wall with an independent rack. In order to prevent the liquid helium-free closed-cycle cooling system from transmitting vibrations to the scanning probe microscope through the floor or through other indirect ways, the vibration from closed-cycle cryogenic cooling system should be suppressed as much as possible. For example, a relatively low vibration pulse tube closed-cycle cooling system may be selected. However, the types of cryogen-free closed-cycle cooling systems disclose herein are not limited to pulse tube cooling systems. They may also be Gifford-McMahon cooling systems, Sterling cooling systems, and improved cooling systems based on these principles. The model being selected can be determined based on the specification of vibration isolation of the scanning probe microscope.

During operation of the scanning probe microscope, the scanning head is located in the center of the room-temperature bore superconducting magnet, which consumes no liquid helium. At least in theory, the scanning probe microscope can also be used in the open air. If used in a vacuum or ultra-high vacuum environment, a portion of the microscope vacuum chamber passes through room-temperature bore of the superconducting magnet, but does not physically contact the chamber of the magnet. In order to prevent the high magnetic field from interfering the performance of the scanning probe microscope while applying a magnetic field to the sample and the probe, the scanning probe microscope system and the microscope chamber passing through the room-temperature bore of the magnet should be made from non-magnetic or weak-magnetic materials. In order to isolate mechanical vibrations from the floor, the scanning probe microscope and the microscope vacuum chamber are placed on a vibration isolation platform.

The computer-controlled circuit system is remotely connected to the scanning probe microscope and controls the operation of the scanning probe microscope.

According to some embodiments of the present disclosure, operating temperature of the scanning probe microscope is independent from the low-temperature environment for operation of the superconducting magnet. The microscope can run at room temperature or can run in a low-temperature environment or varying-temperature environment, provided by liquid helium cryostat, a continuous flow cryostat, or a mechanic vibration-isolated liquid helium-free low-temperature cryostat. Thus, the temperature of the scanning probe microscope is not subject to the low-temperature environment for the operation of superconducting magnet.

According to some embodiments of the present disclosure, because there is no physical contact between the microscope vacuum chamber of the scanning probe microscope and the room-temperature bore of the superconducting magnet, the vacuum chamber of the scanning probe microscope can conveniently achieve high-temperature baking, to realize an ultra-high vacuum environment.

The present disclosure has at least one or more of the following advantages:

1. According to some embodiments of the present disclosure, the high magnetic field scanning probe microscope utilizes a room-temperature bore superconducting magnet that consumes no liquid helium, avoiding the dependence on liquid helium for operation of high magnetic field scanning probe systems.

2. According to some embodiments of the present disclosure, there is no physical contact between the scanning probe microscope and the superconducting magnet connected with the cryogen-free closed-cycle cooling system. Thus, the mechanical vibrations of the closed-cycle cooling system are not directly transmitted to the scanning probe microscope. The scanning probe microscope can achieve atomic resolution.

3. According to some embodiments of the present disclosure, the scanning probe microscope operates independently of the low-temperature environment for operation of the superconducting magnet. The operating temperature of the scanning probe microscope is not subject to the low-temperature environment specified for the operation of the superconducting magnet. While applying a high magnetic field, the scanning head can also perform a wide-range variable temperature measurement.

4. According to some embodiments of the present disclosure, the scanning probe microscope and the vacuum chamber of the microscope can achieve high-temperature baking independent of the room-temperature bore superconducting magnet, to achieve an ultra-high vacuum environment.

Figure 1:
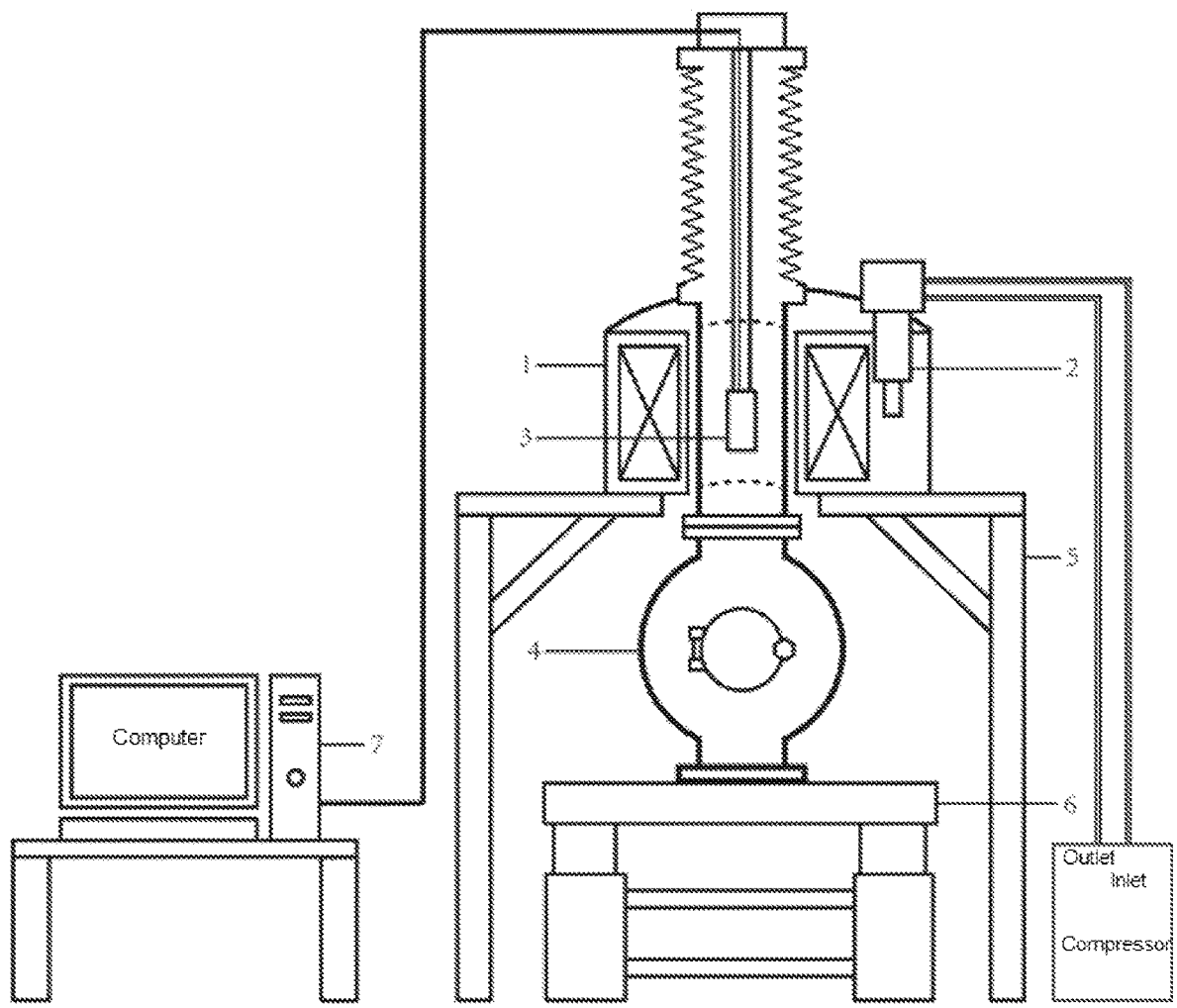
FIG. 1 schematically illustrates a high magnetic field scanning probe microscope based on a liquid helium-free room-temperature bore superconducting magnet according to various embodiments of the present disclosure.

Numerals within the figures: 1—Room-temperature bore superconducting magnet; 2—Closed-cycle cooling system; 3—Scanning probe microscope scanning head; 4—Scanning probe microscope vacuum chamber; 5—Room-temperature bore superconducting magnet rack; 6—Vibration isolation platform; 7—Scanning probe microscope computer-controlled circuit system; 8—Ion pump; 9—Continuous-flow Dewar; 10—linear shift mechanism; 11—Closed-cycle cooling system; 12—Cooling and vibration isolation interface based on helium exchange gas; 13—Fixed closed-cycle cooling system independent rack.

DETAILED DESCRIPTION

Specific embodiments have been collected below as well as reference diagrams for further detailed explanation of the present invention.

The present disclosure describes a solution using a liquid helium consumption-free room-temperature bore superconducting magnet to provide a high magnetic field environment to achieve a high magnetic field scanning probe microscope. A room-temperature bore superconducting magnet 1 is cooled through a cryogen-free closed-cycle cooling system 2 to achieve the superconducting state for operation of the superconducting magnet.

The strongest point of the magnetic field produced by the superconducting magnet 1 at the center of the room-temperature bore chamber, which accommodates the scanning head 3 of the scanning probe microscope and a portion of the microscope vacuum chamber 4. However, there is no physical contact between the room-temperature bore superconducting magnet and the scanning probe microscope in order to prevent the vibrations of the closed-cycle cooling system that cools the superconducting magnet from being directly transmitted to the scanning probe microscope. Additionally, the entire liquid helium-consumption free room-temperature bore superconducting magnet can be fixed to a floor, ceiling, or wall using an independent rack 5.

In order to prevent the liquid helium-free cryogenic cooling system from transmitting vibrations to the scanning probe microscope through the floor or through other indirect ways, the vibrations of the cryogen-free closed-cycle cooling system should be as little as possible. For example, a relatively low vibration pulse tube cooling system may be selected. However, the types of closed-cycle cooling system mentioned are not limited to pulse tube cooling systems. They may also include Gifford-McMahon cooling systems, Sterling cooling systems, and improved cryogen-free cooling systems based on these principles. In some embodiments, the model can be selected based on the vibration isolation specification of the scanning probe microscope. In order to isolate mechanical vibrations from the floor, the scanning probe microscope and vacuum chamber 4 can be placed on a vibration isolation platform 6. The computer-controlled circuit system 7 is connected remotely to the scanning head 3 of the scanning probe microscope and controls the operation of the scanning probe microscope.

The high magnetic field scanning probe microscope described in the present disclosure can achieve spatial resolution in atomic scale. Because the scanning tunneling microscope is a primary member of the scanning probe microscope family, that can achieve atomic-scale resolution, two embodiments are described below based on a scanning tunneling microscope for the purpose of explanation. However, other types of scanning probe microscope can be achieved using the disclosed technology as well.

Figure 2:
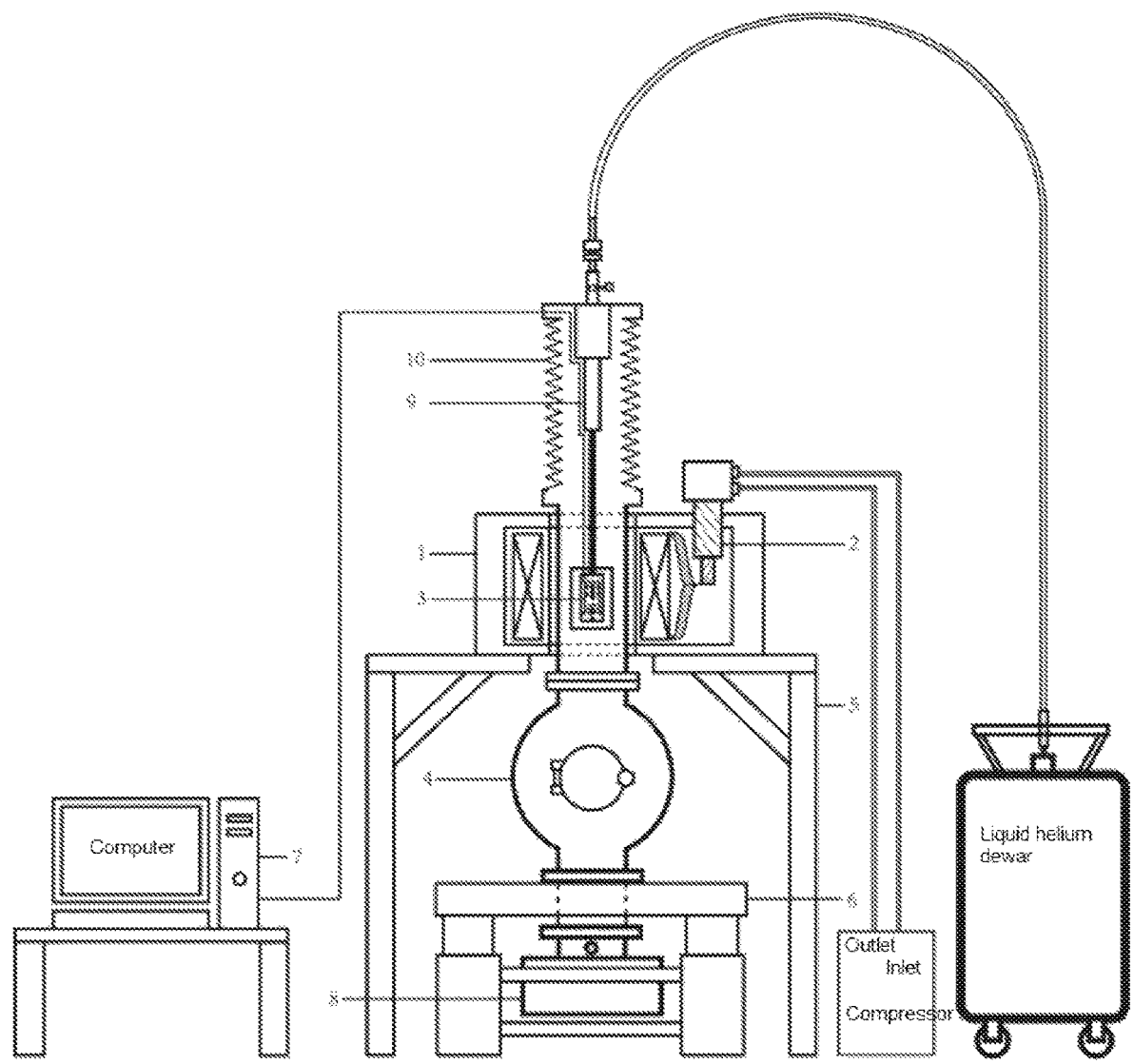
FIG. 2 schematically illustrates a variable-temperature high magnetic field ultra-high vacuum scanning tunneling microscope through continuous-flow dewar cooling according to various embodiments of the present disclosure.

One embodiment relates to a variable-temperature high magnetic field ultra-high vacuum scanning tunneling microscope using continuous-flow Dewar for cooling the scanning head. FIG. 2 schematically illustrates a variable-temperature high magnetic field ultra-high vacuum scanning tunneling microscope through continuous-flow Dewar cooling according to various embodiments of the present disclosure. In this embodiment, the scanning tunneling microscope is placed in an ultra-high vacuum chamber. The ultra-high vacuum environment is achieved and maintained by an ion pump 8. The scanning head 3 of the scanning tunneling microscope is suspended at the cold end of the continuous-flow dewar 9 by damping springs. This ensemble moves through the linear shift mechanisms 10, and can be positioned in the center of the room-temperature bore superconducting magnet 1. The ensemble can also be positioned elsewhere in the ultra-high vacuum chamber 4 to be used for changing samples, scanning tips, etc. The operation temperature of the scanning tunneling microscope is controlled by the operation of the continuous-flow Dewar 9, and is independent of the low temperature for the operation of the superconducting magnet. Thus, the temperature of the scanning tunneling microscope can be higher than the superconducting temperature for the operation of the superconducting magnet.

Figure 3:
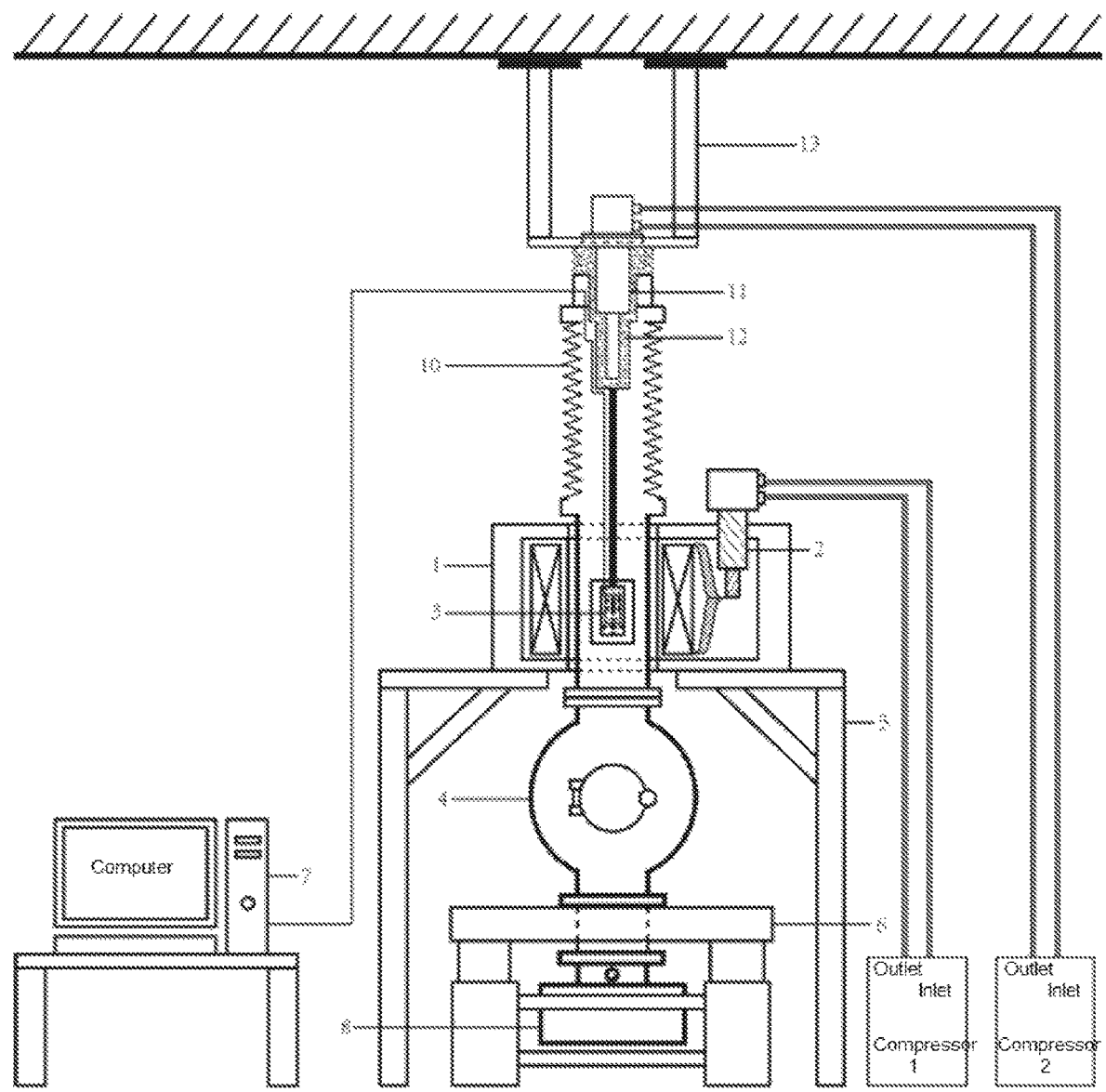
FIG. 3 schematically illustrates a low-temperature high magnetic field ultra-high vacuum scanning tunneling microscope based on cryogen-free closed-cycle cooling system according to various embodiments of the present disclosure.

Another embodiment relates a low-temperature high magnetic field ultra-high vacuum scanning tunneling microscope based on cryogen-free closed-cycle cooling system. FIG. 3 schematically illustrates a low-temperature high magnetic field ultra-high vacuum scanning tunneling microscope based on cryogen-free closed-cycle cooling system according to various embodiments of the present disclosure. In this embodiment, the low-temperature environment of the scanning tunneling microscope is achieved using another cryogen-free closed-cycle cooling system 11, eliminating the dependence on liquid helium when cooling down the scanning head. The mechanical vibrations of the cryogen-free closed-cycle cooling system 11, which used to cool the scanning tunneling microscope, are mechanically isolated by using the cooling and vibration isolation interface 12 based on helium heat exchange gas. The cryogen-free closed-cycle cooling system 11 itself also uses an independent rack 13 to be fixed to, e.g., a floor, ceiling, or wall. In combination with a liquid helium consumption-free room-temperature bore superconducting magnet 1, the whole ensemble of the high magnetic field low-temperature ultra-high vacuum scanning tunneling microscope set does not require any liquid helium. Similar to the example of the previous embodiment, the temperature of the scanning tunneling microscope is not subject to the low-temperature environment for operation of the superconducting magnet, and can be higher or lower than the temperature of superconducting magnet.

In the two embodiments described above, the room-temperature bore superconducting magnet that achieves a high magnetic field environment can utilize a cryogen-free closed-cycle cooling system that does not consume liquid helium, avoiding the dependence on liquid helium. There is no physical contact between the ultra-high vacuum scanning tunneling microscope and the room-temperature bore superconducting magnet, so the mechanical vibrations of the cryogen-free cooling system are not directly transmitted to the scanning tunneling microscope. Thus, the scanning probe microscope can achieve atomic-scale spatial resolution. The operation of the scanning tunneling microscope is independent of the low-temperature environment for operation of the superconducting magnet. The temperature of the microscope is not subject to the low-temperature requirements for operation of the superconducting magnet. The scanning tunneling microscope and the vacuum chamber can achieve high-temperature baking independent of the room-temperature superconducting magnet, achieving an ultra-high vacuum environment.

The specific embodiments above further describe the purposes, technical solutions, and beneficial outcomes of the present disclosure. It should be understood that the above descriptions are only specific embodiments of the present disclosure and are not limitations of the present disclosure. Any modification, equivalent replacement or improvement performed within the spirit or principle of the present disclosure should be included within the scope of protection of the present disclosure.

What is claimed is:

1. A microscope system, comprising:
    a scanning probe microscope including a scanning head and a vacuum chamber; and
    a superconducting magnet defining a room-temperature bore, the room-temperature bore accommodating the scanning head and at least a portion of the vacuum chamber;
    wherein there is no direct physical contact between the scanning probe microscope and the superconducting magnet.

2. The microscopic system of claim 1, further comprising:
    a first cryogen-free closed-cycle cooling system configured to provide a cryogenic temperature for operation of the superconducting magnet.

3. The microscopic system of claim 2, wherein during operation the first cryogen-free closed-cycle cooling system generates mechanical vibrations that are not directly transmitted to the scanning probe microscope.

4. The microscope system of claim 2, further comprising:
a superconducting magnet thermally connects to the cold end of the first cryogen-free closed-cycle cooling system through high thermal conductivity materials such as oxygen-free copper; or a superconducting magnet is bathed inside liquid helium wherein the liquid helium is maintained by the first cryogen-free closed-cycle cooling system.

5. The microscopic system of claim 1, wherein an operation temperature of the scanning probe microscope does not depend on the cryogenic temperature for operation of the superconducting magnet.

6. The microscopic system of claim 1, further comprising:
a computer control system remotely connected to and configured to control operation of the scanning probe microscope.

7. The microscopic system of claim 1, further comprising:
a superconducting magnet rack to which the superconducting magnet attached.

8. The microscopic system of claim 1, further comprising:
a vibration isolation platform on which the microscope vacuum chamber of the scanning probe microscope is disposed.

9. The microscopic system of claim 1, further comprising:
a continuous-flow helium Dewar configured to maintain an operation temperature of the scanning probe microscope, wherein the operation temperature of the scanning probe microscope is independent from the cryogenic temperature for operation of the superconducting magnet.

10. The microscopic system of claim 1, further comprising:
linear shift mechanisms connected to the scanning head and configured to move the scanning head across the vacuum chamber.

11. The microscopic system of claim 1, further comprising:
a second cryogen-free closed-cycle cooling system configured to provide an operation temperature of the scanning probe microscope; and
a cooling and vibration isolation interface filled with helium heat exchange gas configured to isolate a mechanical vibration of the second cryogen-free closed-cycle cooling system from the scanning probe microscope.

12. The microscopic system of claim 11, further comprising:
a superconducting magnet rack to which the superconducting magnet is attached,
a cooling system rack to which the second cryogen-free closed-cycle cooling system is attached, wherein the cooling system rack is not in physical contact with the superconducting magnet rack.

13. The microscopic system of claim 1, wherein during operation, the superconducting magnet is configured to produce a magnetic field having a strongest point at the center of the room-temperature bore defined by the superconducting magnet.

14. The microscopic system of claim 1, wherein during operation, the scanning head of the scanning probe microscope locates at the center of the room-temperature bore defined by the superconducting magnet.

15. A microscopic system, comprising:
a scanning probe microscope including a scanning head and a microscope vacuum chamber;
a superconducting magnet defining a room-temperature bore, the room-temperature bore accommodating the scanning head and at least a portion of the microscope vacuum chamber; and
a continuous-flow helium Dewar configured to maintain an operation temperature of the scanning probe microscope;
wherein there is no direct physical contact between the scanning probe microscope and the superconducting magnet.

16. The microscopic system of claim 15, further comprising:
a first cryogen-free closed-cycle cooling system configured to provide a cryogenic temperature for operation of the superconducting magnet.

17. The microscopic system of claim 16, wherein the operation temperature of the scanning probe microscope is independent from the cryogenic temperature for operation of the superconducting magnet.

18. A microscopic system, comprising:
a scanning probe microscope including a scanning head and a microscope vacuum chamber;
a superconducting magnet defining a room-temperature bore, the room-temperature bore accommodating the scanning head and at least a portion of the microscope vacuum chamber;
a first cryogen-free closed-cycle cooling system configured to provide a cryogenic temperature for operation of the superconducting magnet; and
a second cryogen-free closed-cycle cooling system configured to provide an operation temperature of the scanning probe microscope;
wherein there is no direct physical contact between the scanning probe microscope and the superconducting magnet.

19. The microscopic system of claim 18, further comprising:
a cooling and vibration isolation interface filled with helium heat exchange gas configured to isolate a mechanical vibration of the second cryogen-free closed-cycle cooling system from the scanning probe microscope.

20. The microscopic system of claim 18, further comprising:
a first rack to which the superconducting magnet is attached,
a second rack to which the second cryogen-free closed-cycle cooling system is attached, wherein the second rack is not in physical contact with the first rack.

* * * * *